Jan. 10, 1961 S. RUBEN 2,967,898
PRIMARY CELL
Filed Nov. 19, 1957
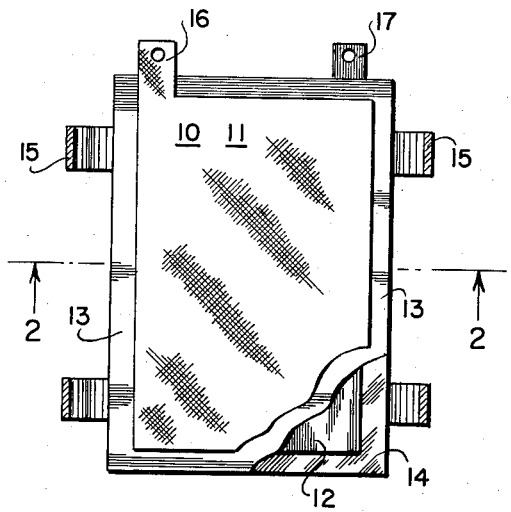
FIG. I
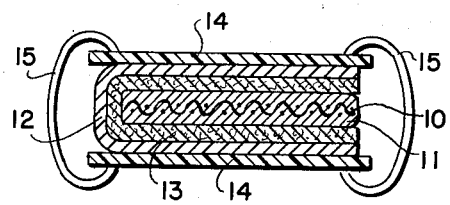
FIG. 2
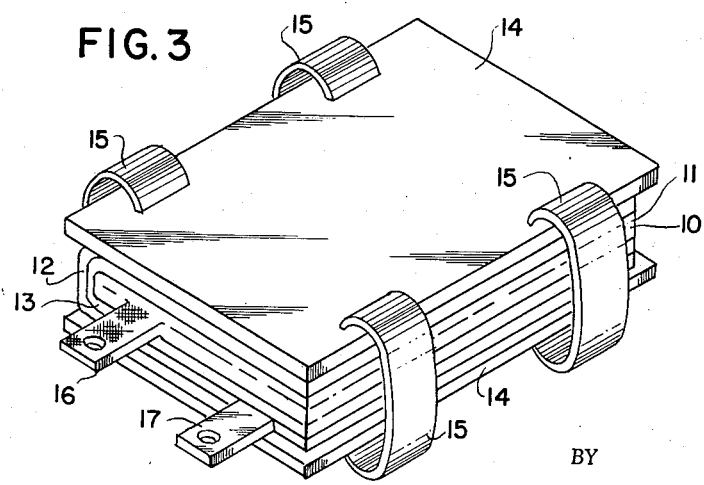
FIG. 3
INVENTOR.
Samuel Ruben
BY
ATTORNEY United States Patent Office 2,967,898
Patented Jan. 10, 1961

2,967,898
PRIMARY CELL

Samuel Ruben, 271 North Ave., New Rochelle, N.Y.

Filed Nov. 19, 1957, Ser. No. 697,470

9 Claims. (Cl. 136—119)

This invention relates to electric current producing cells, and, more particularly, to a galvanic cell utilizing a compound of mercury as its depolarizer.

In my co-pending application Serial No. 637,971, filed February 4, 1957, now Patent No. 2,814,664, dated November 26, 1957, and in my co-pending application Serial No. 687,927, filed October 3, 1957, now Patent No. 2,948,769, dated August 9, 1960, I have disclosed and claimed an electric current producing cell comprising a zinc anode, a cathode depolarizer essentially consisting of a major proportion of mercuric dioxysulfate ($3HgO.SO_3$ or $HgSO_4.2HgO$) and a minor proportion of carbon black, and a compatible electrolyte which is substantially inert with respect to the depolarizer, such as a sulfate salt or sulfamate electroylte.

The present application is a continuation-in-part of my above-mentioned co-pending applications and constitutes an improvement thereover.

It is an object of the present invention to improve electric current producing cells, particularly cells utilizing a depolarizer comprising mercuric dioxysulfate.

It is another object of the present invention to provide electric current producing cells comprising a depolarizer of mercuric dioxysulfate and capable of delivering current at a relatively high rate.

It is a special object of the invention to provide a primary cell structure in which a depolarizer of mercuric dioxysulfate may be used without the addition of more conductive material admixed therewith.

Other and further objects and advantages of the present invention will become apparent from the following description, taken in conjunction with the accompanying drawing, in which:

Fig. 1 is a top elevational view, somewhat fragmentary in character and having parts broken away for reasons of clarity, of an electric current producing cell embodying the invention;

Fig. 2 is a transverse sectional view taken on line 2—2 of Fig. 1; and

Fig. 3 is a perspective view of the cell shown in Figs. 1 and 2.

For a number of practical applications, it is desirable to have a primary cell structure which is capable of discharging its capacity at a high rate of current. To accomplish this effectively required cells constructed with electrodes of large surface area and having thin spacer elements between the electrodes. Among the problems encountered were the following: the thin spacer elements, which were necessarily electrolyte absorbent, would become oxidized by the depolarizer; the porosity of these spacers would become excessive to an extent where migration of deleterious particles from one electrode to the other took place. In some cases, these spacer elements became oxidized to the point where they failed to meet spacer requirements.

I have found that the depolarizers of mercuric dioxysulfate disclosed in my above mentioned applications possess the desirable characteristics of having practically no deleterious effect on spacers of porous cellulosic material. Thus, when using such depolarizers, it is possible to construct cells having thin cellulosic spacers in contact with the depolarizer over long periods of time without causing destructive oxidation or degradation of the spacers and providing very close spacing between the cathode and the anode. I have further discovered that the depolarizer of mercuric dioxysulfate has the further advantage that electrical contact may be directly made with the depolarizer mix of mercuric dioxysulfate and carbon by inert metals, such as particularly stainless steel or titanium. This allows the use of screen electrodes whereby maximum electrode areas may be obtained.

Referring now more particularly to the drawing, illustrating a preferred embodiment of the invention, reference numeral 10 denotes a screen of inert metal, such as a screen of #304 stainless steel of a mesh number of 100 and having a layer 11 of electrolyte-impregnated depolarizer pressed into the interstices thereof. The depolarizer is preferably composed of 8 parts by weight of mercuric dioxysulfate, $3HgO.SO_3$, and 1 part by weight of Shawinagin carbon black. The depolarizer is mixed with the electrolyte, which may consist of a 15% aqueous solution of zinc sulfamate having a pH of about 4.5. A suitable inhibitor, such as 1% by weight of potassium dichromate, is added to the electrolyte in order to reduce the open circuit reactivity of the zinc anode with the electrolyte to a negligible value. The depolarizer mix composed of mercuric dioxysulfate and carbon black is admixed with the electrolyte in the proportion of 2 parts by weight of the mix for 1 part by weight of the electrolyte. Although the above electrolyte compositions and proportions represent preferred values, other electrolytes and relative proportions may be used, such as are disclosed in my above-mentioned co-pending applications.

The depolarizer-electrolyte mixture is spread on screen 10 and is pressed into the interstices thereof, constituting cathode-depolarizer layer 11. The anode of the cell is constituted by a slightly amalgamated zinc sheet 12 bent into a U-shaped configuration in order to utilize both sides of the cathode. The depolarizer cathode 11 is separated from the amalgamated zinc anode 12 by means of a spacer 13, which is likewise bent into a U-shaped configuration and is made of a 0.002" thick kraft paper strip coated to a thickness of 0.004"–0.0045" with a plasticized sodium carboxymethylcellulose (CMC) solution composed of 4% by weight CMC, 4% by weight glycerine and 92% by weight water.

As will be observed in Figs. 2 and 3, the structural elements of the cell, comprising cathode-depolarizer 11, anode 12, and spacer 13, are held in continuous pressure contact by means of plastic insulating plates 14, one at each side of the cell. These plates are in turn clamped together by means of C-shaped steel springs 15, the ends of which engage the marginal regions of the plastic plates. Coated screen 10 and zinc anode 12 are provided with integrally formed tabs or extensions 16 and 17, respectively, which extend beyond insulating plates 14 and constitute the electrical terminals of the cell. To provide cells of larger capacity, any desired number of parallel-connected cathode-depolarizer plates and anode plates may be clamped together between the pair of insulating plates. While stainless steel provides the most economical cathode support, for some applications the more expensive titanium wire screen may be used.

Where the above described flat electrode structure is not suitable, a wound-type electrode structure may be used in which the cathode-supporting screen, the anode, and the spacer strip therebetween, are wound up into a roll with the edges of the cathode support and of the anode protruding from the roll in opposite directions. An example of cell structures of this type is disclosed in my Patent No. 2,422,045, dated June 10, 1947 (Fig. 13).

For some applications, where the current requirement is very small but the maintenance of constant voltage and a long shelf life are important, the depolarizer of mercuric dioxysulfate mixed with the electrolyte can be coated on the cathode support or screen without the addition of a finely divided inert electronic conductor, such as carbon or graphite. In all other respects, the structure of the cell may be the same as described in the foregoing and shown in the accompanying drawing. In this case, the current discharge takes place from the interface of the metal support contacting the mercuric salt and as the mercuric dioxysulfate is reduced to metallic mercury, the discharge proceeds outwards toward the spacer. Where a flat or rolled up metal foil is used as the cathode support, rather than a wire screen, a binder agent, such as a 3% solution of polystyrene in xylol, may be added to the depolarizer to assure intimate contact and good adherence between the support and the depolarizer layer thereon. In this construction, the depolarizer-binder mixture may be sprayed, rolled or otherwise deposited on stainless steel (or other suitable metal) sheet or strip in a thin coating and thereafter rolled and compressed. The electrolyte is held within the pores of the absorbent spacer.

In my prior Patent No. 2,422,045, I describe a cell utilizing a cathode electrode of steel in contact with the depolarizer and an alkaline electrolyte, the pH of which must be above 7. In the present invention, the pH of the electrolyte must be less than 7 to avoid decomposition and reduction to mercuric oxide of the dioxysulfate.

Although the present invention has been disclosed in connection with preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

I claim:

1. An electric current producing cell comprising a cathode support of stainless steel, a depolarizer layer composed essentially of mercuric dioxysulfate on and substantially coextensive with said support, an anode, and an electrolyte in which said depolarizer is stable and substantially insoluble.

2. An electric current producing cell comprising a cathode support of stainless steel, a depolarizer layer of which the effective depolarizing constituent is composed essentially of mercuric dioxysulfate on and in substantially coextensive contacting relation with said support, a zinc anode, a porous spacer layer interposed between said depolarizer and said anode, and an electrolyte in which said depolarizer is stable and substantially insoluble absorbed in said depolarizer.

3. An electric current producing cell comprising a cathode support in the form of a screen of stainless steel, a cathode depolarizer consisting essentially of a major proportion of mercuric dioxysulfate and a minor proportion of carbon black pressed into the interstices of said screen, an amalgamated zinc anode, a porous spacer layer interposed between said depolarizer and said anode, and an electrolyte in which said depolarizer is stable and substantially insoluble impregnating said depolarizer.

4. A primary cell comprising a foraminous cathode support of stainless steel, a layer of cathode-depolarizer mix pressed on and substantially coextensive with said support, said mix consisting essentially of a major proportion of mercuric dioxysulfate having admixed therewith a minor proportion of carbon black, a zinc anode, a porous spacer layer interposed between said depolarizer and said anode, and a compatible electrolyte in which said depolarizer is stable and substantially insoluble impregnating said depolarizer mix.

5. The primary cell according to claim 2, in which the spacer layer is coated with an aqueous plasticized sodium-carboxymethylcellulose solution.

6. The primary cell according to claim 2, in which the electrolyte is selected from the group consisting of sulfate salts and sulfamates.

7. A primary cell comprising a cathode support of stainless steel, a depolarizer layer consisting essentially of mercuric dioxysulfate on and bonded to said support and substantially coextensive therewith, said depolarizer being substantially free from carbon black and similar finely divided material of higher conductivity, a zinc anode, a porous spacer layer interposed between said depolarizer and said anode, and a compatible electrolyte having a pH less than 7.

8. A cathode-depolarizer electrode for electric current producing cells comprising a support of stainless steel, and a depolarizer layer of which the effective depolarizing constituent consists of mercuric dioxysulfate consolidated on and substantially coextensive with said support.

9. A cathode depolarizer electrode for electric current producing cells comprising a support of stainless steel, and a depolarizer layer consolidated on the surface of said support and bonded thereto, said layer being substantially coextensive with said support and consisting essentially of mercuric dioxysulfate in the absence of finely divided inert material of higher conductivity.

References Cited in the file of this patent

UNITED STATES PATENTS

| | | |
|---|---|---|
| 1,918,717 | Ruben | July 18, 1933 |
| 2,576,266 | Ruben | Nov. 27, 1951 |
| 2,631,115 | Fox | Mar. 10, 1953 |
| 2,632,783 | Coleman et al. | Mar. 24, 1953 |
| 2,715,652 | Chubb et al. | Aug. 16, 1955 |
| 2,810,006 | Ruben | Oct. 15, 1957 |
| 2,814,663 | Ruben | Nov. 26, 1957 |
| 2,814,664 | Ruben | Nov. 26, 1957 |

OTHER REFERENCES

Ser. No. 394,417, Marhenkel (A.P.C.), published May 11, 1943.